US012621574B2

(12) United States Patent
Kuchiki

(10) Patent No.: US 12,621,574 B2
(45) Date of Patent: May 5, 2026

(54) IMAGE PROCESSING APPARATUS TO GENERATE COMPOSITE IMAGE, CONTROL METHOD, AND RECORDING MEDIUM

(71) Applicant: CANON KABUSHIKI KAISHA, Tokyo (JP)

(72) Inventor: Hiroaki Kuchiki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 18/182,184

(22) Filed: Mar. 10, 2023

(65) Prior Publication Data

US 2023/0300472 A1     Sep. 21, 2023

(30) Foreign Application Priority Data

Mar. 16, 2022     (JP) .................................. 2022-041764

(51) Int. Cl.
*G06T 5/50*          (2006.01)
*G06V 10/60*       (2022.01)
*H04N 23/741*     (2023.01)

(52) U.S. Cl.
CPC ............. *H04N 23/741* (2023.01); *G06T 5/50* (2013.01); *G06V 10/60* (2022.01); *G06T 2207/20208* (2013.01); *G06T 2207/20221* (2013.01)

(58) Field of Classification Search
CPC ...... H04N 23/741; H04N 1/387; H04N 23/71; G06T 5/50; G06T 2207/20208; G06T 2207/20221; G06V 10/60
See application file for complete search history.

(56) References Cited

U.S. PATENT DOCUMENTS

2020/0336645 A1* 10/2020 Fukuda ............ H04N 21/44008
2022/0199054 A1*  6/2022 Suzuki ...................... G06T 5/92

FOREIGN PATENT DOCUMENTS

JP          2016-515327 A      5/2016
JP          2019506817 A      3/2019
JP          2020-039118 A      3/2020
JP          2021124638 A      8/2021
WO        2014/130213 A1    8/2014

* cited by examiner

*Primary Examiner* — Phuoc Tran
(74) *Attorney, Agent, or Firm* — Canon U.S.A., Inc. IP Division

(57)          ABSTRACT

An image processing apparatus includes at least one processor and at least one memory containing instructions that cause the at least one processor to be configured to function as an acquisition unit, a decision unit, and a generation unit. The acquisition unit is configured to acquire a plurality of images including at least one High Dynamic Range (HDR) image. The decision unit is configured to decide a peak luminance value of the composite image. The generation unit is configured to generate the composite image by executing additive composition processing using the plurality of images. The generation unit controls the additive composition processing so that a signal level of each pixel of the composite image falls within an output dynamic range whose maximum value is set to a signal level corresponding to the peak luminance value decided by the decision unit.

13 Claims, 9 Drawing Sheets

F I G. 1
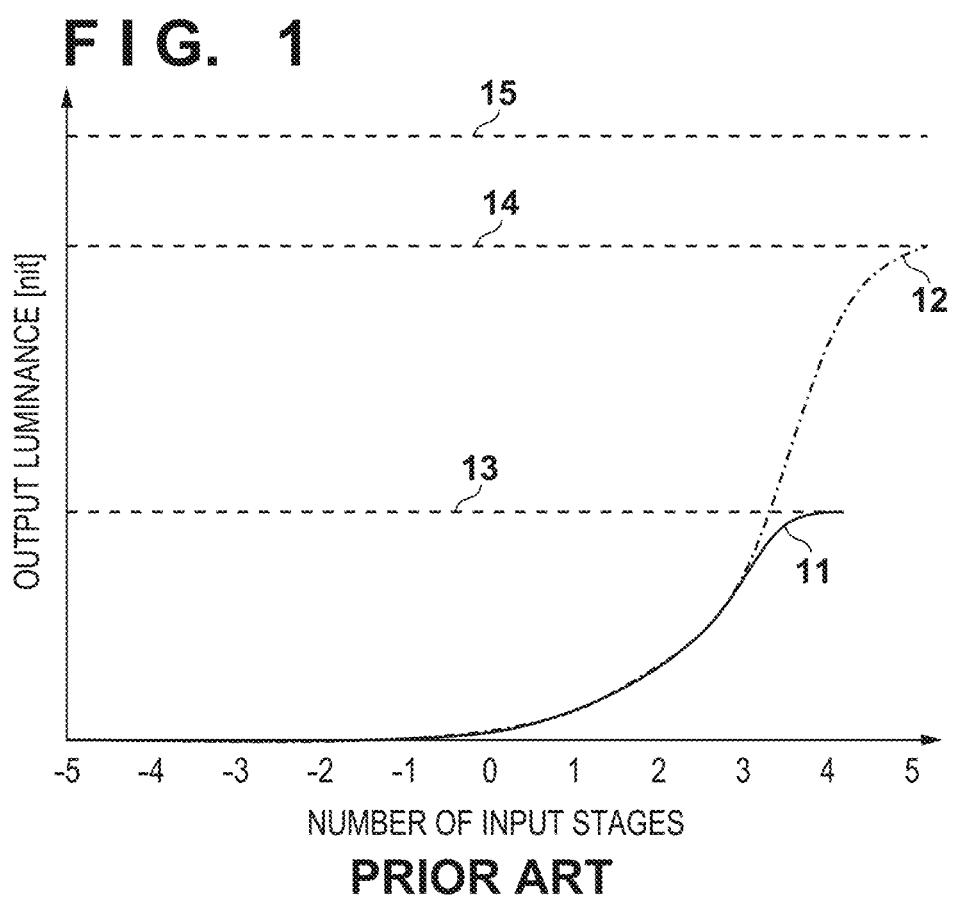

F I G. 3
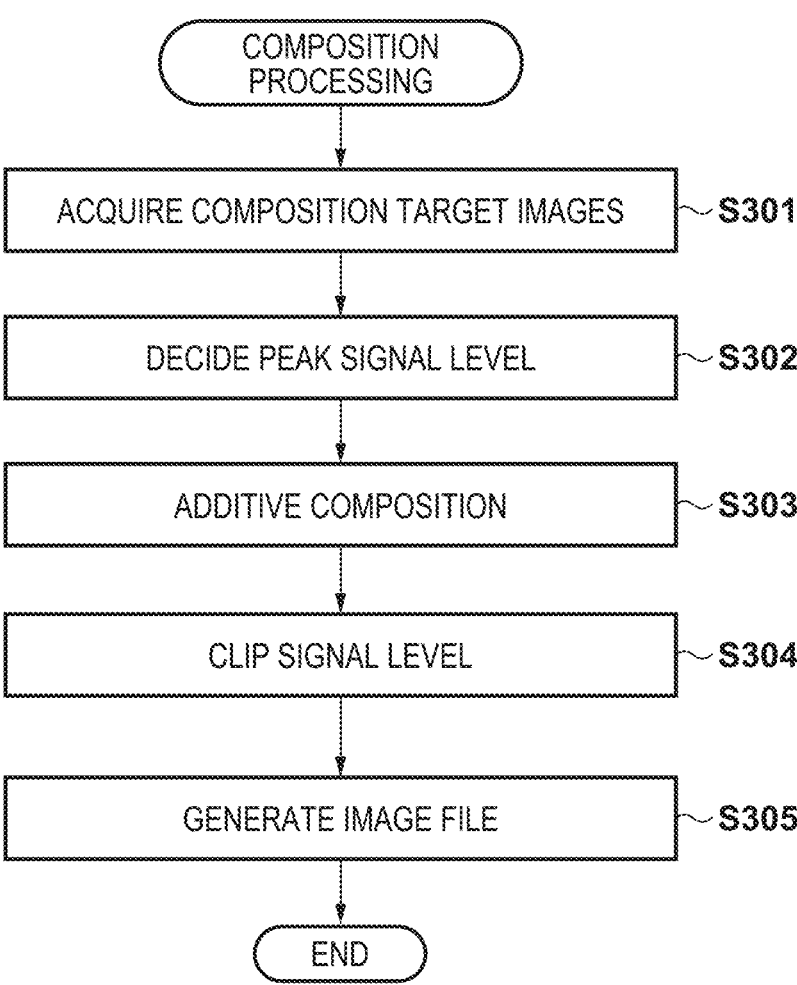

F I G. 4A
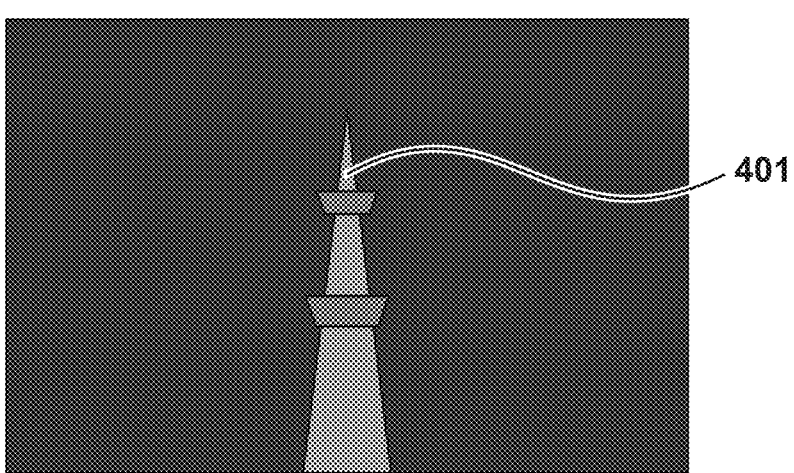
401
F I G. 4B
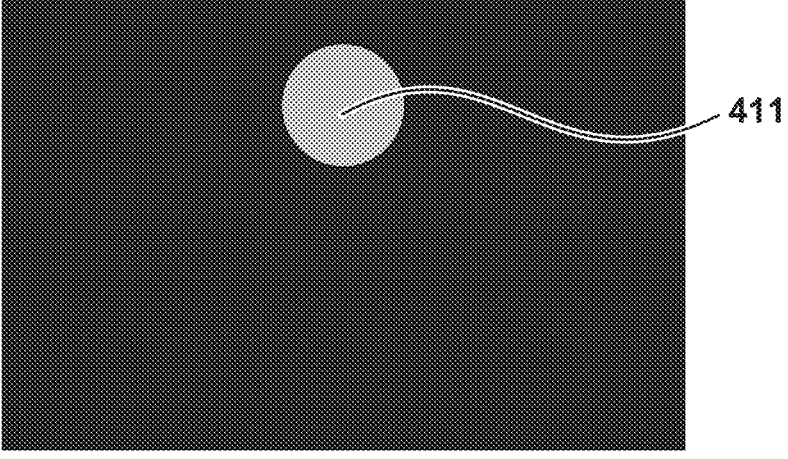
411

F I G.  6A
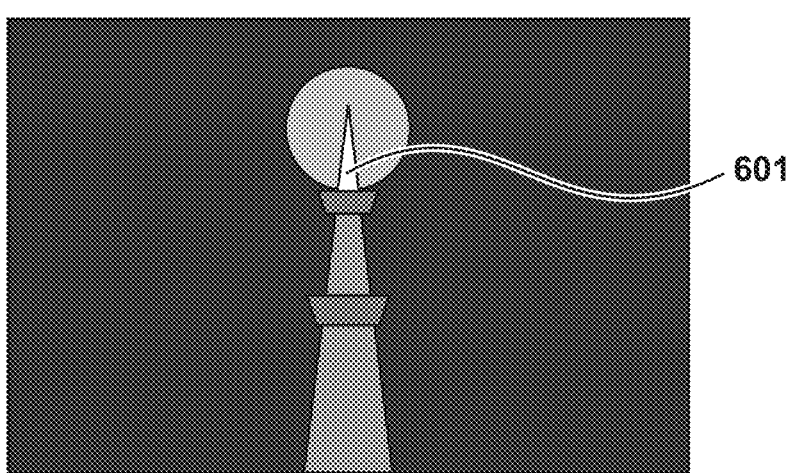
601
F I G.  6B
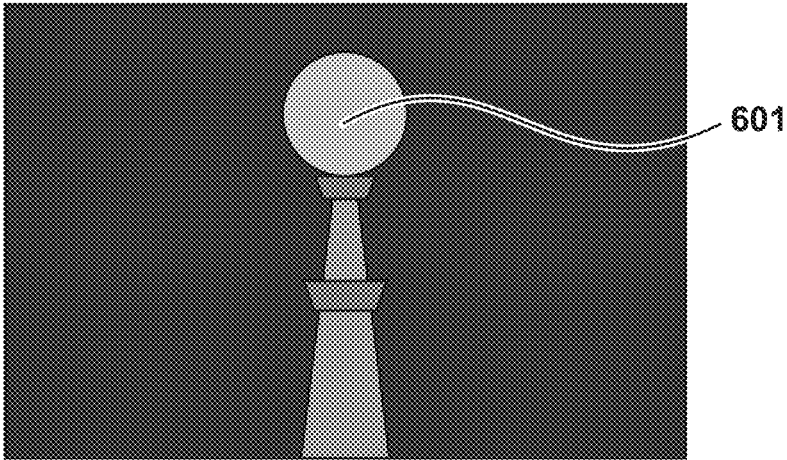
601

F I G. 8A
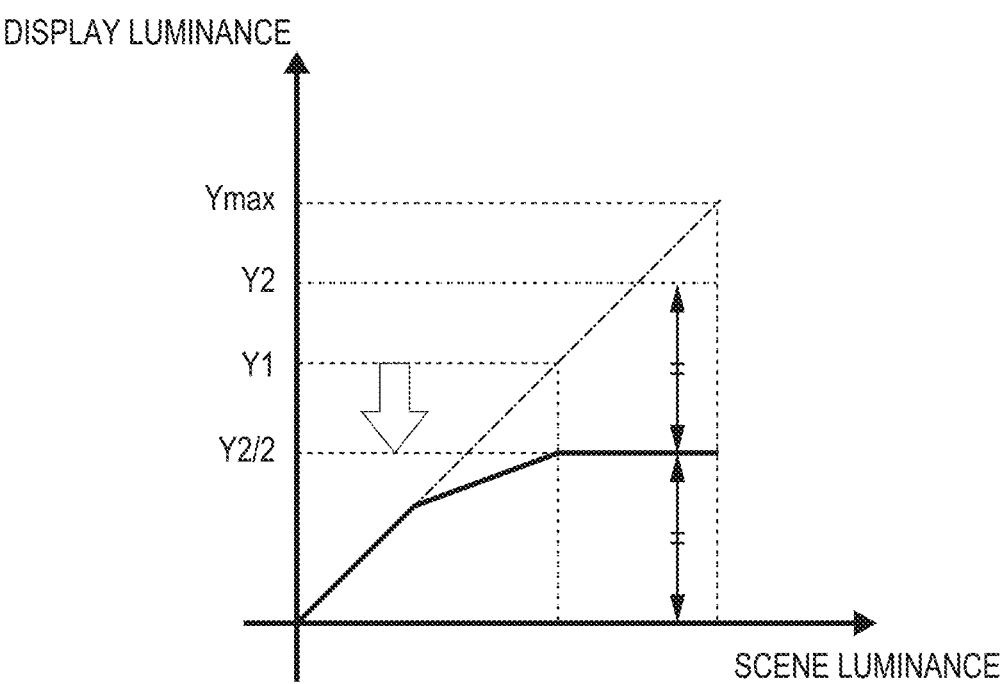
F I G. 8B
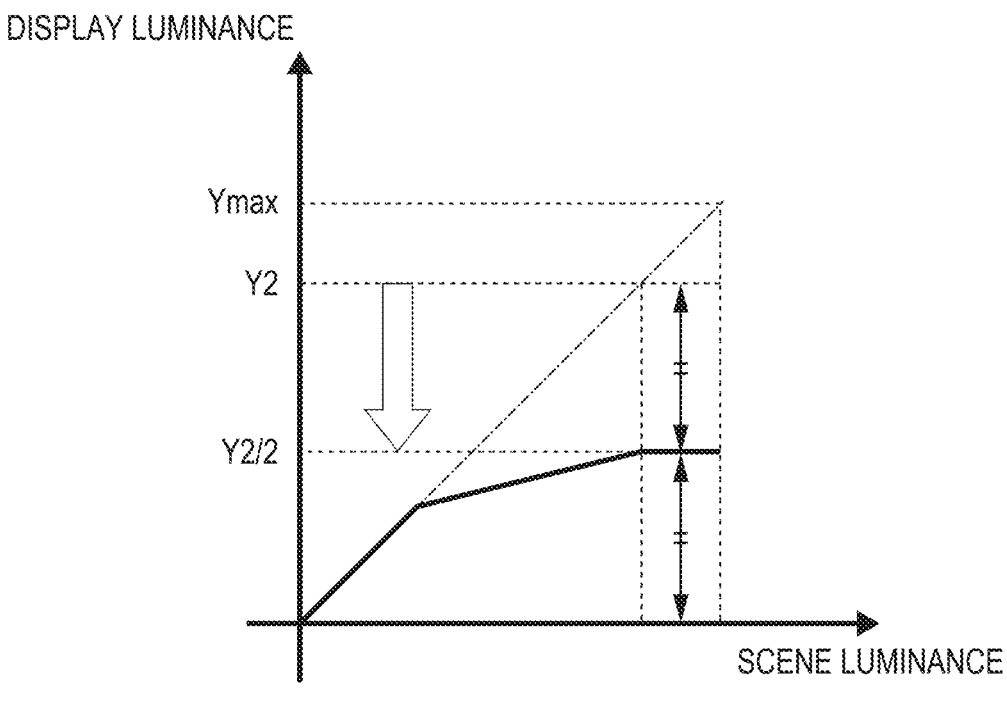

F I G. 9A
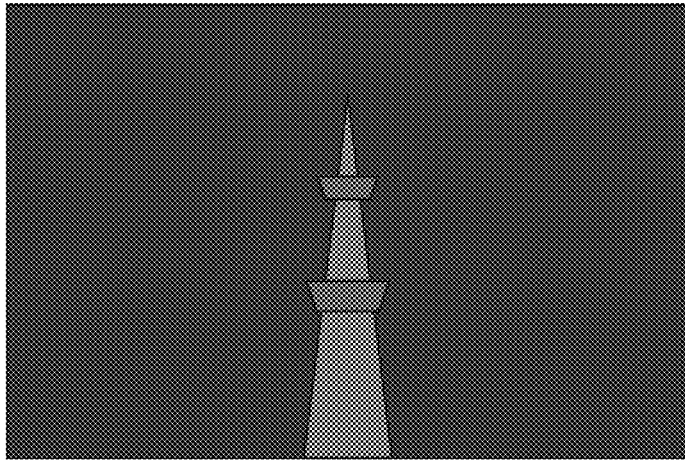
F I G. 9B
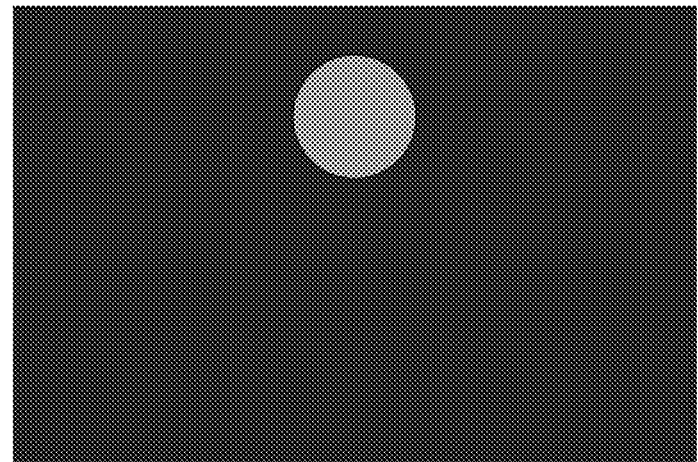
F I G. 9C
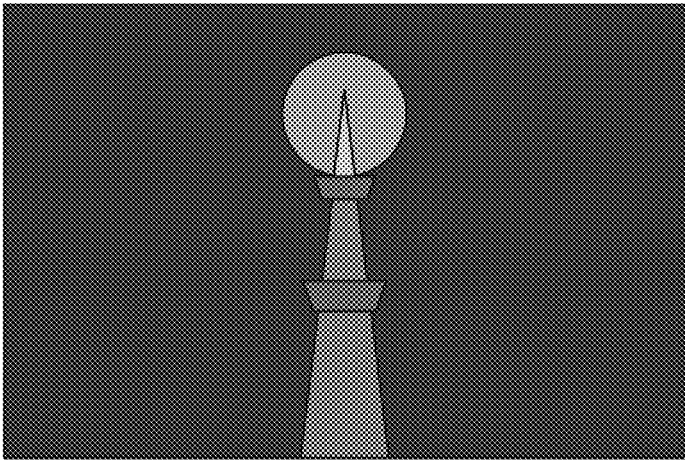

F I G. 10A
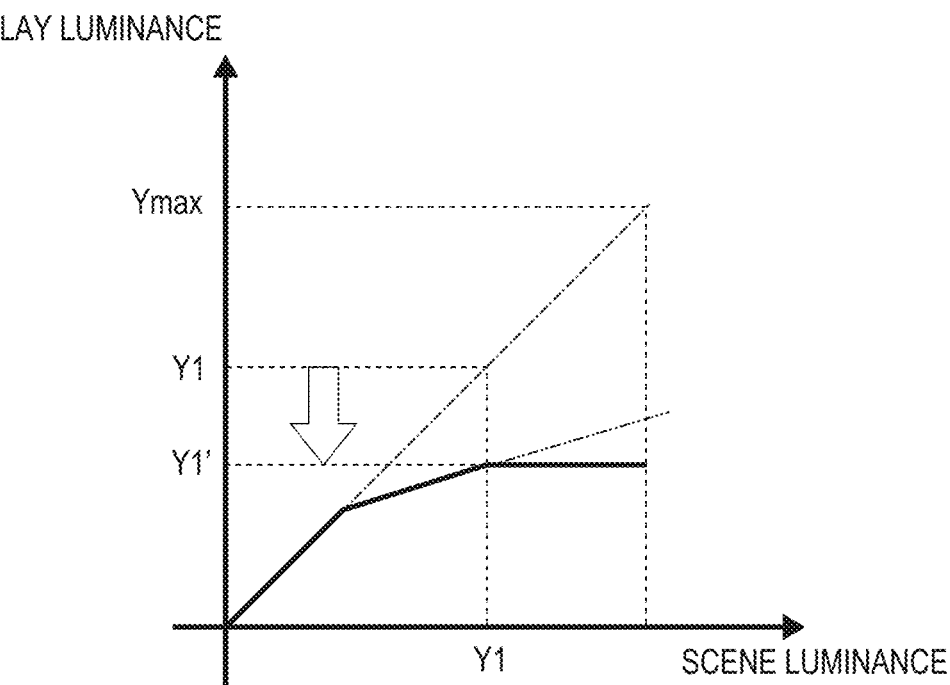
F I G. 10B
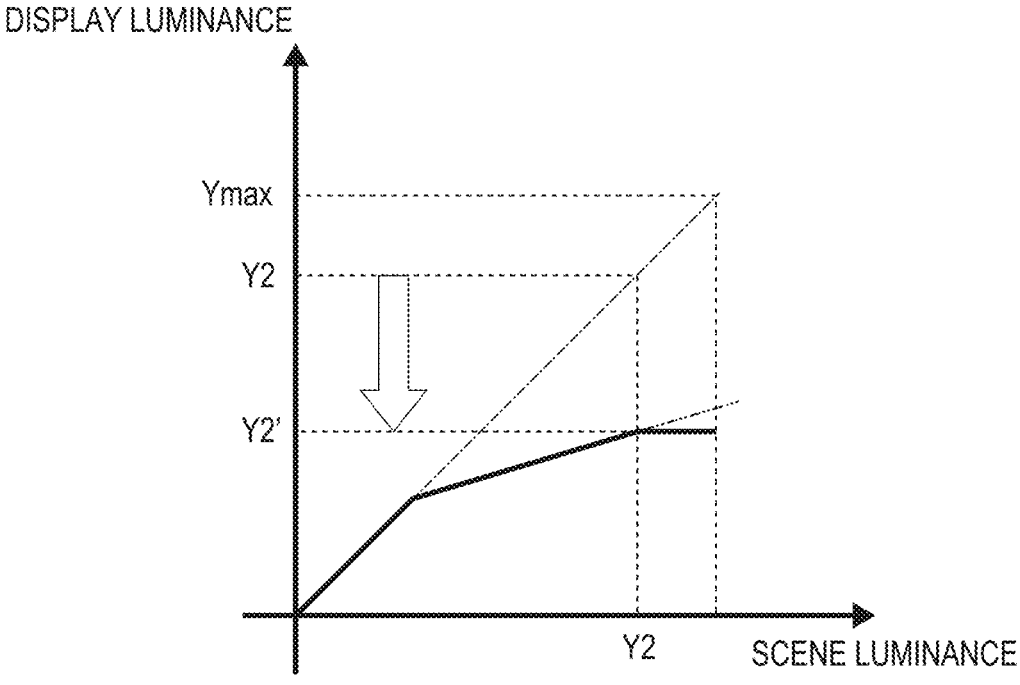

IMAGE PROCESSING APPARATUS TO GENERATE COMPOSITE IMAGE, CONTROL METHOD, AND RECORDING MEDIUM

BACKGROUND

Technical Field

One disclosed aspect of the embodiments relates to an image processing apparatus, a control method, and a recording medium and, more particularly, to a technique of generating a composite image using an HDR image.

Description of the Related Art

As a method of generating a composite image of a multiple exposure expression, there is provided additive composition. In additive composition, pixel values of respective pixels of a plurality of images to be composited are added to decide the pixel value of a corresponding pixel of the composite image.

A general sRGB 8-bit image such as a JPEG image is a Standard Dynamic Range (SDR) image, in which the luminance (scene luminance) of a captured scene is represented by a pixel value falling within the range of 0 to 255. If a composite image of a multiple exposure expression is obtained by performing additive composition of SDR images, the output composite image is also an SDR image represented by pixel values each falling within the range of 0 to 255. The SDR image relatively expresses the brightness of an object, and the brightness when the SDR image obtained by additive composition is displayed on the display device tends not to be significantly different from the brightness of the image as the composition target.

On the other hand, in recent years, a display device called an HDR display in which the performance of a light emitting element such as an LED is improved and the display luminance dynamic range is wider than that of a conventional display device has appeared on the market, and the display device can display an image of a gradation expression corresponding to the dynamic range wider than that of the SDR image. Therefore, some image capturing apparatuses can record a High Dynamic Range (HDR) image so that an expression of a detail and color in each luminance range can be confirmed on the display device. Such an HDR image has, as a pixel value, 10-bit display luminance, that is, display luminance from 0 to 1,023 generally obtained by converting the scene luminance.

A signal characteristic representing the relationship between the display luminance and a video signal level in the HDR image is defined by an Electro-Optical Transfer Function (EOTF), and the following two kinds of methods are adopted. One method is a Hybrid Log Gamma (HLG) method standardized in ARM STD-B67, in which a video signal level is converted into the relative value of the display luminance and the display luminance corresponding to the maximum luminance that can be output from the display device is obtained. The other method is a Perceptual Quantization (PQ) method standardized in SMPTE ST 2084 or ITU-R BT.2100, in which the video signal level is converted into the absolute value of the display luminance within a maximum range of 10,000 nit (or cd/m2). Therefore, when displaying an HDR image obtained by capturing a scene, scene luminance is converted into display luminance corresponding to the maximum luminance that can be output from the display device in the former method, and scene luminance is converted into display luminance that is absolutely determined regardless of the display device in the latter method. Thus, if display on the display device adopting the PQ method is assumed, for example, it is necessary to convert an image signal of scene luminance to indicate an absolute luminance value in encoding in the image capturing apparatus, thereby generating an HDR image.

Therefore, in encoding in the PQ method of absolutely representing scene luminance, even if the same scene is captured, a peak luminance value (the maximum value of the display luminance and the maximum value of the output dynamic range) included in the HDR image may change. This is because the scene luminance with which the sensor output is saturated changes in accordance with an image capturing mode and the like and thus a gamma curve used for conversion varies to assign the absolute display luminance to the same scene luminance. For example, as shown in FIG. 1, the input/output characteristics (the relationships between the number of input stages and output luminance) in two kinds of image capturing modes of different exposure amounts are different in terms of the peak luminance value (the maximum value of the output luminance). In this example, an input/output characteristic 11 in the image capturing mode of a high exposure amount is indicated by a solid line and an input/output characteristic 12 in the image capturing mode of a low exposure amount is indicated by an alternate long and short dashed line. As shown in FIG. 1, in the two image capturing modes, a common input/output characteristic is indicated in a region other than a high-luminance region, and scene luminance is converted into the same display luminance regardless of the exposure amount while the peak luminance value varies between values 13 and 14 in the high-luminance region in accordance with a difference in luminance with which the output is saturated. Note that a value 15 indicates the maximum value (1023) of 10-bit luminance, and corresponds to the maximum display luminance of 10,000 nit in the PQ method.

Therefore, images of composition targets of a multiple exposure expression can include not only SDR images but also HDR images with different dynamic ranges. As described above, HDR images (to be referred to as HDRPQ images hereinafter) of the PQ method with the different peak luminance values, that is the different maximum values of the output dynamic ranges can be composition targets. Japanese Patent Laid-Open No. 2016-515327 discloses a method in which when generating a display image by compositing images with different dynamic ranges, the dynamic range of the overlay image is assigned to a range perceptually coinciding with the overlaid image.

However, a method disclosed in Japanese Patent Laid-Open No. 2016-515327 mainly assumes that one image with the adjusted dynamic range is dominantly displayed, and does not assume that the output range changes between the composition target image and the composite image by additive composition. Therefore, for example, if additive composition of images with the different maximum values of the output luminance assumed for the respective images or images not indicating 1023 with 10 bits is performed, part of an object image may exhibit brightness different from assumed one at the time of display.

SUMMARY

An embodiment has been made in consideration of the above problem and provides an image processing apparatus for generating a composite image indicating a preferable brightness expression when performing additive composition of a plurality of images including one or more HDR images, a control method, and a recording medium.

The disclosure in its first aspect provides an image processing apparatus for generating a composite image including at least one processor and at least one memory. The at least one memory contains instructions that, when executed by the at least one processor, cause the at least one processor to be configured to function as an acquisition unit, a decision unit, and a generation unit. The acquisition unit is configured to acquire a plurality of images including at least one HDR image. The decision unit is configured to decide a peak luminance value of the composite image. The generation unit is configured to generate the composite image by executing additive composition processing using the plurality of images. The generation unit controls the additive composition processing so that a signal level of each pixel of the composite image falls within an output dynamic range whose maximum value is set to a signal level corresponding to the peak luminance value decided by the decision unit.

The disclosure in its second aspect provides a control method for an image processing apparatus that generates a composite image, including acquiring a plurality of images including at least one HDR image, deciding a peak luminance value of the composite image, and generating the composite image by executing additive composition processing using the plurality of images. In the generating, the additive composition processing is controlled so that a signal level of each pixel of the composite image falls within an output dynamic range whose maximum value is set to a signal level corresponding to the peak luminance value decided in the deciding.

The disclosure in its third aspect provides a computer-readable recording medium recording a program for causing a computer to function as each unit of the image processing apparatus of the first aspect.

Further features of the disclosure will become apparent from the following description of exemplary embodiments (with reference to the attached drawings).

BRIEF DESCRIPTION OF THE DRAWINGS

FIG. 1 is a prior art graph for explaining input/output characteristics in two kinds of image capturing modes of different exposure amounts.

FIG. 3 is a flowchart exemplifying composition processing executed by the image processing apparatus 100 according to the first embodiment.

FIGS. 4A and 4B are views exemplifying HDR images as composition targets according to the embodiments and the modifications of the disclosure.

FIGS. 6A and 6B are views each for explaining a composite image according to the embodiments of the disclosure.

FIGS. 8A and 8B are graphs each exemplifying conversion of the dynamic range of an HDR image as a composition target according to the second embodiment of the disclosure.

FIGS. 9A, 9B, and 9C are views each exemplifying an image whose dynamic range is converted according to the second embodiment of the disclosure.

FIGS. 10A and 10B are graphs each exemplifying conversion of the dynamic range of an HDR image as a composition target according to the first modification of the disclosure.

DESCRIPTION OF THE EMBODIMENTS

First Embodiment

Figure 2:
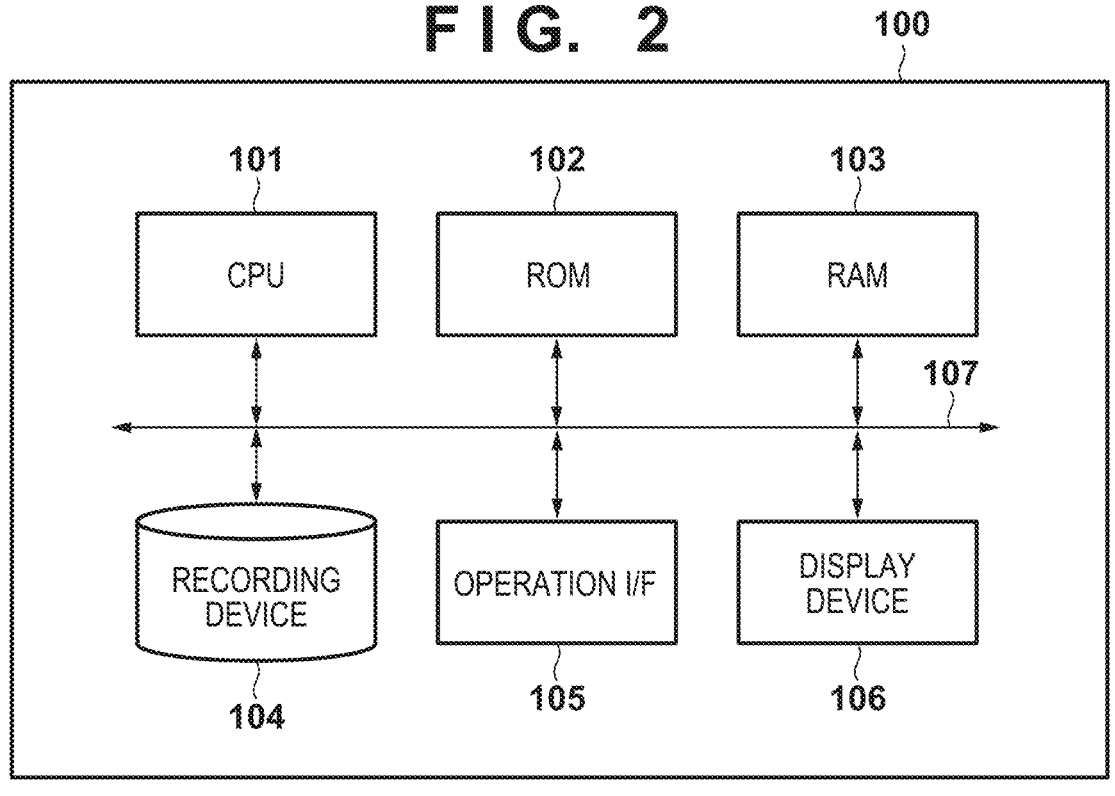
FIG. 2 is a block diagram exemplifying the hardware arrangement of an image processing apparatus 100 according to embodiments and modifications of the disclosure.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

In an embodiment to be described below, an example in which the disclosure is applied to an image processing apparatus, as an example of an image processing apparatus, that can generate a composite image of a multiple exposure expression by performing additive composition of two HDR images encoded by the PQ method is described. However, the disclosure is applicable to an arbitrary apparatus that can generate a composite image by executing additive composition processing using a plurality of images including one or more HDR images.

In this specification, an "HDR image" is an image (PQ signal) encoded by the PQ method standardized in ITU-R BT.2100 and formed to be able to acquire absolute display luminance by decoding, unless otherwise specified. In this embodiment, images used to generate a composite image are actually captured images obtained by capturing an image capturing scene. The following description assumes that the composite image is a PQ signal, similar to the HDR image.

Assume here that an at least 10-bit depth is required to represent an HDR characteristic by a PQ signal, and each of the HDR image and the composite image is not a file storing a 8-bit image in, for example, a JPEG format. For example, each of the HDR image and the composite image may be a HEIF file stored using the High Efficiency Image File Format (to be referred to as HEIF hereinafter) container as an image file format defined in MPEG-H Part 12 (ISO/IEC 23008-12) developed by the Moving Picture Experts Group (MPEG).

<<Hardware Arrangement of Image Processing Apparatus>>

FIG. 2 is a block diagram showing the hardware arrangement of an image processing apparatus 100 according to this embodiment. As shown in FIG. 2, the image processing apparatus 100 according to this embodiment includes a CPU 101, a Read Only Memory (ROM) 102, a Random Access Memory (RAM) 103, a recording device 104, an operation I/F 105, a display device 106, and a system bus 107.

The CPU 101 controls the overall image processing apparatus 100. The ROM 102 is a storage device that stores a control program such as a BIOS necessary to activate the image processing apparatus 100, and programs, parameters, and data which need not be changed. The RAM 103 is a storage device having a work area of the CPU 101, a primary storage area for temporarily storing various data, a load area of various programs, and the like.

The recording device 104 is a recording device that stores an OS program, various control programs, various software programs executable on the OS program, and various data such as an HDR image to be used for composition processing (to be described later) and a composite image obtained as a result of composition processing. The recording device 104 includes, for example, a hard disk or a flash memory incorporated in or detachably connected to the image processing apparatus 100, and a flexible disk, an optical disk, a magnetooptical disk, an IC card, or a memory card detachably connected to the image processing apparatus 100. Therefore, the CPU 101 can control the image processing apparatus 100 by deploying various programs stored in the ROM 102 or the recording device 104 into the RAM 103 and executing them.

The operation I/F 105 is a user interface provided in the image processing apparatus 100, such as a keyboard, a mouse, or a touch panel. If an operation input by a user is detected, the operation I/F 105 sends a control signal associated with the operation to the CPU 101. The display device 106 is, for example, a liquid crystal display, and displays various kinds of information including a graphical user interface associated with software or the OS operating on the image processing apparatus 100. The system bus 107 communicably connects the respective blocks forming the image processing apparatus 100.

The image processing apparatus 100 may be a dedicated apparatus that develops and edits a captured RAW image. In this case, a composition processing program can be stored in the ROM 102. Furthermore, a general-purpose personal computer (PC) can function as the image processing apparatus 100 when the CPU 101 deploys the composition processing program stored in the recording device 104 into the RAM 103. An image capturing apparatus that can acquire a RAW image by image capturing can also function as the image processing apparatus 100 when the control unit of the image capturing apparatus executes the composition processing program or an image processing unit for performing composition processing executes a predetermined operation.

<<Composition Processing>>

Composition processing of generating a composite image by performing additive composition of two HDR images as composition targets in the image processing apparatus 100 having the above arrangement according to this embodiment is described in detail with reference to a flowchart shown in FIG. 3. The processing corresponding to the flowchart is implemented when the CPU 101 reads out, for example, a corresponding processing program stored in the ROM 102, deploys it into the RAM 103, and executes it. Assume that this composition processing is started when, for example, an operation input associated with generation of a composite image is accepted via the operation I/F 105.

In operation S301, the CPU 101 acquires two different HDR images as composition targets. The HDR images as composition targets are recorded in, for example, the recording device 104, and the CPU 101 reads out these images for composition processing and deploys them into the RAM 103, thereby implementing the acquisition processing. In the following description, the two HDR images as composition targets will sometimes be referred to as a first target image and a second target image, respectively, hereinafter.

In operation S302, the CPU 101 decides the peak luminance value of a composite image generated by the composition processing. As described above, the composite image generated by the composition processing is an HDR image of the PQ format, and a signal level corresponding to absolute display luminance is defined in the dynamic range of the HDR image. The peak luminance value is the maximum value of display luminance indicated by an image appearing in the composite image, that is, the maximum value of the output dynamic range. In the composition processing of this embodiment, the CPU 101 decides the peak luminance value of the composite image based on the peak luminance values of the HDR images (the first target image and the second target image) as composition targets.

The peak luminance value of the HDR image as a composition target may be included in an image file (HEIF file or the like) associated with the HDR image or may be associated with the HDR image as another file. In this embodiment, the image file associated with each HDR image as a composition target is added, as metadata, with the Maximum Dynamic Range Level (MaxDRL). MaxDRL indicates the maximum value of the PQ signal output value after the corresponding OETF is applied in development and encoding of the captured image signal, and indicates the peak luminance value (upper limit value) of the PQ signal. Note, this embodiment assumes that MaxDRL indicates the signal level corresponding to the peak luminance of each HDR image. However, the disclosure is not limited to this, and for example, MaxDRL may indicate the nit value corresponding to the peak luminance.

The CPU 101 acquires MaxDRL of each of the first target image and the second target image, and decides a larger one of the MaxDRL values as the peak luminance value of the composite image to be generated. The peak luminance value decided in this operation will be referred to as a "peak signal level" hereinafter.

In operation S303, the CPU 101 generates an image (to be referred to as an intermediate image hereinafter) by performing additive composition of the first target image and the second target image. More specifically, the CPU 101 acquires the signal levels of pixels at the identical positions in the first target image and the second target image, and adds them (signal values), thereby deriving the signal level of the corresponding pixel in the intermediate image. The CPU 101 performs such signal level addition processing for all the pixels, and derives the signal levels of all the pixels of the intermediate image, thereby forming the intermediate image. Note that this embodiment assumes that the first target image and the second target image have the same numbers of pixels in the horizontal and vertical directions for the sake of easy understanding but the disclosure is not limited to this. If the first target image and the second target image have different numbers of pixels, for example, one image is scaled to have the same number of pixels in the horizontal or vertical direction as that of the other image and then additive composition is performed. Furthermore, since the intermediate image has a concept different from that of the image output for display, even if a signal level exceeds the maximum value (corresponding to 10,000 nit) of the dynamic range of the PQ format by additive composition, the value can be maintained and stored. That is, the signal level of each pixel of the intermediate image simply indicates the added value of the signal level of the pixel at the same position of the first target image and the signal level of the pixel at the same position of the second target image.

In operation S304, the CPU 101 generates a composite image by clipping the signal level of the intermediate image by the peak signal level decided in operation S302. In other words, the CPU 101 generates a composite image by specifying a pixel whose signal level exceeds the peak signal level among the pixels included in the intermediate image and changing (replacing) the signal level of the pixel to the peak signal level.

The composition processing of this embodiment will now be schematically described with reference to the accompanying drawings. The following example assumes that the first target image is as shown in FIG. 4A and the second target image is as shown in FIG. 4B. The two images are HDR images actually captured in different image capturing modes, and have different output dynamic ranges. More specifically, the first target image is an image obtained by capturing an object that is darker than the second target image, and the output dynamic range of the first target image is narrower than that of the second target image, which has a low maximum value, that is, a low peak luminance value.

Figure 5A:
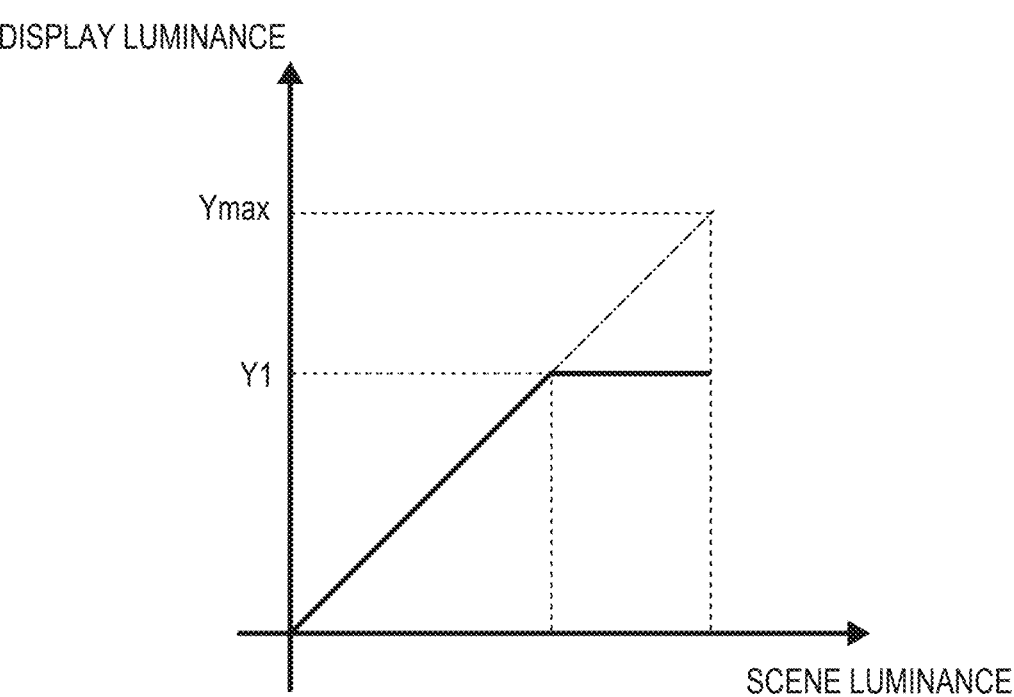
FIGS. 5A and 5B are graphs exemplifying the signal characteristics of the HDR images as composition targets according to the embodiments and the modifications of the disclosure.
Figure 5B:
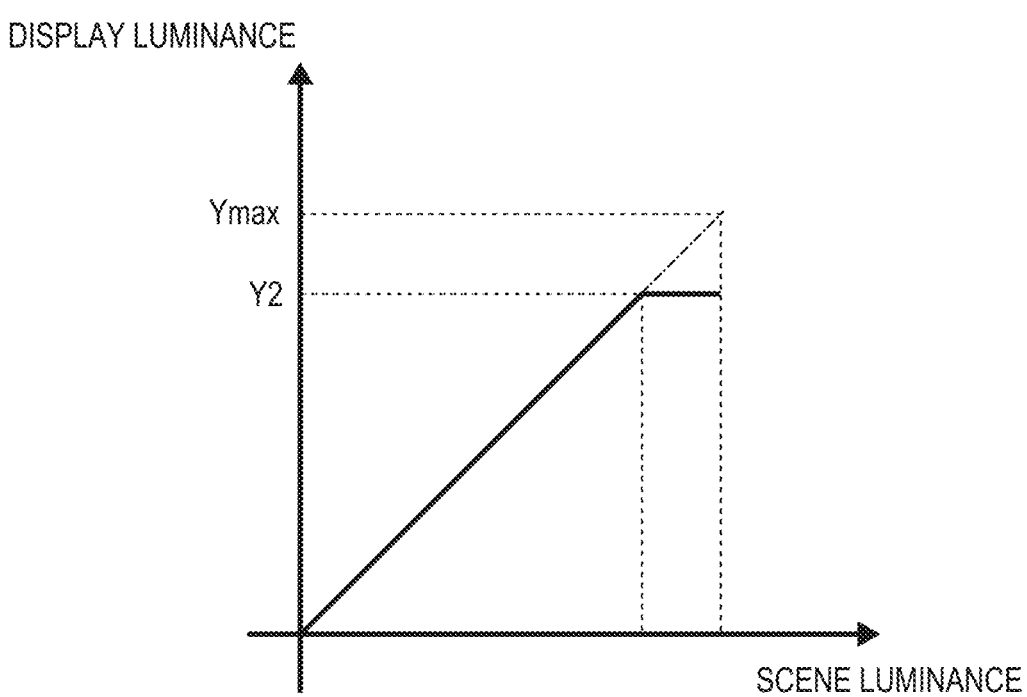

FIGS. 5A and 5B each show the relationship (signal characteristic) between display luminance and scene luminance of each image, and indicates a difference in peak luminance value (MaxDRL). More specifically, FIG. 5A shows the signal characteristic of the first target image and the peak luminance value is Y1. Assume that in the first target image shown in FIG. 4A, the signal level of a pixel included in a region 401 is Y1. FIG. 5B shows the signal characteristic of the second target image and the peak luminance value is Y2 higher than Y1. In the second target image shown in FIG. 4B, the signal level of a pixel included in a region 411 is Y2. Note that the ordinate and the abscissa represent signal values (for example, PQValueCode), respectively. Ymax indicated in each of the signal characteristics shown in FIGS. 5A and 5B represents the maximum value of the dynamic range of the PQ format, that is, the maximum display luminance (the signal value corresponding to 10,000 nit). The same applies to FIGS. 8A, 8B, 10A, and 10B to be described later.

At this time, an intermediate image obtained by simply performing additive composition of the first target image and the second target image is as shown in FIG. 6A. As shown in FIG. 6A, the signal level of a pixel included in a region 601 where the region 401 of the first target image and the region 411 overlap each other becomes higher by additive composition. For example, if Y1 is 712 (corresponding to 600 nit) and Y2 is 769 (1,000 nit), 712+769=1481 is obtained, which exceeds 1,023 as the maximum display luminance. That is, if the intermediate image is output as a composite image, when the image is displayed using the display device capable of displaying luminance higher than 1,000 nit, the luminance of the region 601 is higher than the peak luminance value Y2 of the second target image and the image is displayed with the maximum luminance, which is not preferable. That is, a composite image that does not maintain an expression of brightness and gradation appearing in the first target image and the second target image before composition is obtained.

Therefore, in the composition processing of this embodiment, the processing of clipping the signal level by the peak signal level in operation S304 obtains an expression shown in FIG. 6B, in which the signal level of the pixel in the region 601 of the intermediate image is saturated by the peak signal level. More specifically, in the form shown in FIGS. 4A and 4B in which the peak luminance value is higher in the second target image, Y2 as the peak luminance value of the second target image is decided as the peak signal level, and thus a composite image of an expression in which the signal level of the pixel at the position of the region 601 is set to Y2, as shown in FIG. 6B, can be obtained.

In operation S305, the CPU 101 forms an image file by associating the composite image generated in operation S304 with the peak signal level, and records the image file in the recording device 104, thereby completing the composition processing. For the image file, for example, a format having a file structure that can store metadata, such as the HEIF format, may be used. In this case, information of the peak signal level is stored in metadata and is associated with the composite image. As described above, by recording the image file of the composite image in association with the information of the peak signal level, an image converted in accordance with the assumed dynamic range can be displayed even in the SDR environment.

As described above, when performing additive composition of a plurality of images including one or more HDR images, the image processing apparatus of this embodiment can generate a composite image indicating a preferable brightness expression.

Second Embodiment

The above embodiment has explained the form in which a composite image is generated such that the maximum value of the output dynamic range is made equal to or lower than the peak signal level by clipping, by the peak signal level, the signal level of the intermediate image obtained by simply performing additive composition of composition target images. On the other hand, in the form in which the signal level is clipped by the peak signal level after additive composition, a gradation expression represented in the intermediate image within a level range from the peak signal level to the maximum value of the signal level after addition is lost. This embodiment will describe a method of generating a composite image whose signal level obtained as a result of additive composition is made equal to or lower than a peak signal level by converting the dynamic range of each composition target image before additive composition.

<<Composition Processing>>

Figure 7:
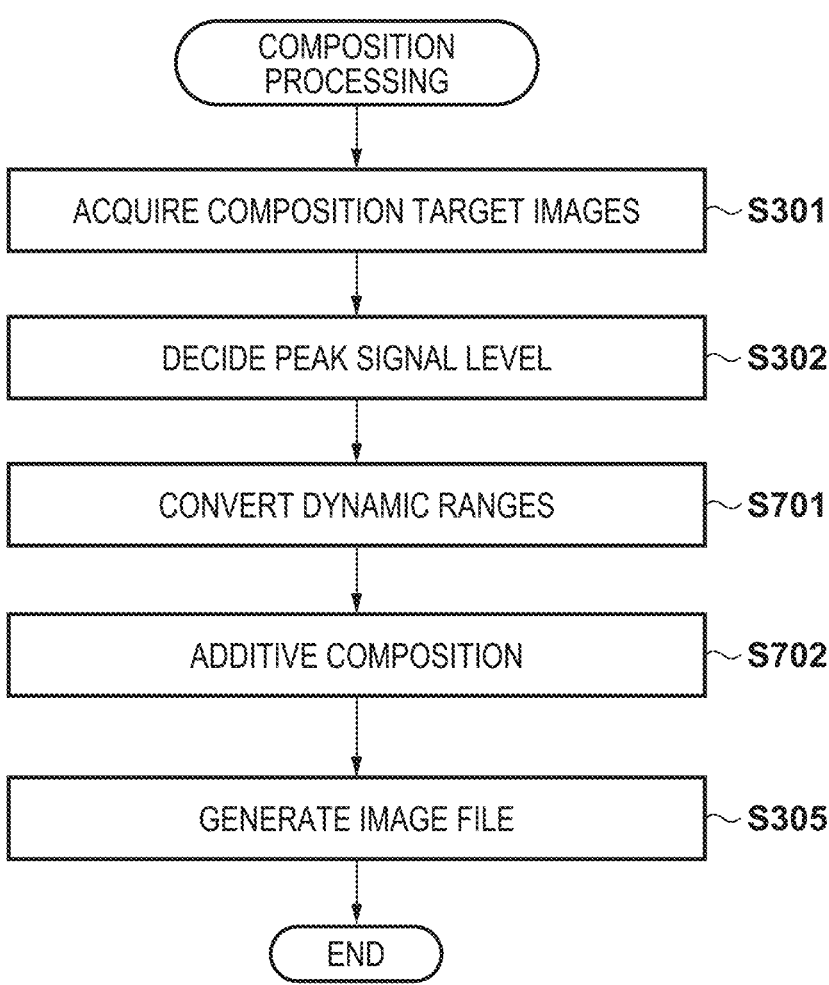
FIG. 7 is a flowchart illustrating an example of image processing according to the second embodiment of the disclosure.

Composition processing executed by an image processing apparatus 100 according to this embodiment will be described in detail below with reference to a flowchart shown in FIG. 7. The processing corresponding to this flowchart can be implemented when, for example, a CPU 101 reads out a corresponding processing program stored in a ROM 102, deploys it into a RAM 103, and executes it. Assume that this composition processing is started when, for example, an operation input associated with generation of a composite image is accepted via an operation I/F 105. Note that in the description of the composition processing of this embodiment, operations of executing the same processes as those of the composition processing according to the first embodiment are denoted by the same reference symbols, and a description thereof will be omitted. Only operations of executing processes unique to this embodiment will be described below.

After the peak signal level is decided in operation S302, the CPU 101 converts, in operation S701, the dynamic range of each of the first target image and the second target image so the signal level of a composite image obtained after additive composition does not exceed the peak signal level.

The dynamic range conversion processing executed in this operation will be described with reference to the accompanying drawings. If the first target image and the second target image are as shown in FIGS. 4A and 4B, respectively, and the signal characteristics are as shown in FIGS. 5A and 5B, respectively, the dynamic ranges of the respective target images are converted, as shown in, for example, FIGS. 8A and 8B. More specifically, in this operation, the dynamic ranges of the respective target images are converted so that the maximum signal level (display luminance) that can be obtained by the composite image formed by performing additive composition of the first target image and the second target image after conversion is set to the peak signal level acquired in operation S302. Therefore, in this embodiment, since the two composition target images are used, the maximum value of the display luminance of each target image after conversion is set to a value (Y2/2) obtained by dividing the peak signal level by 2. That is, in the form of compositing two HDR images, a value obtained by equally dividing a higher one of the peak luminance values by the number of composition target images is set as the maximum value of the display luminance of each target image after conversion. That is, in the processing of this operation, the maximum value of the display luminance of each of the first target image and the second target image after conversion is the maximum value of Y2/2.

The dynamic range is converted, so that a gradation expression in each target image remains, using a knee characteristic of compressing the dynamic range so that the maximum value is equal to or lower than Y2/2 within a level range exceeding a predetermined knee point defined with respect to the scene luminance, as shown in FIGS. 8A and 8B.

FIG. 8A shows a signal characteristic between the scene luminance of an object and the display luminance of an image (first converted image) obtained by converting the first target image by the knee characteristic. As shown in FIG. 8A, in the signal characteristic associated with the first converted image, a gradation is kept linearly with respect to the scene luminance (dark portion) up to the predetermined knee point and the display luminance is compressed with respect to the scene luminance (bright portion) exceeding the knee point. More specifically, with respect to the scene luminance of the bright portion, compression is performed to assign a range from the predetermined knee point to the saturation scene luminance in the first target image (the lowest scene luminance as the peak luminance value in the first target image) to a level range from the predetermined knee point to Y2/2.

FIG. 8B similarly shows a signal characteristic between the scene luminance of the object and the display luminance of an image (second converted image) obtained by converting the second target image by the above-described knee characteristic. As shown in FIG. 8B, in the signal characteristic associated with the second converted image, a gradation is kept linearly with respect to the scene luminance (dark portion) up to the predetermined knee point and the display luminance is compressed with respect to the scene luminance (bright portion) exceeding the knee point, similar to the first converted image. More specifically, with respect to the scene luminance of the bright portion, compression is performed to assign a range from the predetermined knee point to the saturation scene luminance in the second target image (the lowest scene luminance as the peak luminance value in the second target image) to a level range from the predetermined knee point to Y2/2.

Note that as the predetermined knee point associated with conversion of each composition target image, for example, luminance at a level increased/decreased by a predetermined number of stages from luminance of proper exposure may fixedly be used. As the compression amount of the dynamic range increases, the predetermined knee point may be moved toward the dark portion. In conversion of the dynamic range, linearly keeping the gradation with respect to the dark portion is based on the fact that more bits are assigned to the dark portion in encoding of the PQ format in accordance with the human visual characteristic.

FIGS. 9A and 9B exemplify the thus obtained first converted image and second converted image, respectively. In each of the images, the brightness of a region where the peak luminance value is indicated is reduced, as compared with each of the first target image and the second target image respectively shown in FIGS. 4A and 4B.

After the first converted image and the second converted image are generated by converting the dynamic ranges in operation S701, the CPU 101 generates, in operation S702, a composite image by performing additive composition of the first converted image and the second converted image. As described above, since in the composition processing of this embodiment, the peak luminance value of each converted image is adjusted to a value of ½ of the peak signal level, a pixel of a signal level exceeding the peak signal level is not generated in an image obtained by additive composition, unlike the first embodiment. Therefore, the processing of clipping the signal level is unnecessary after additive composition, and the obtained image can be processed as a composite image. The composite image obtained at this time has a gradation expression of each of the first target image and the second target image within a level range in which the maximum value of the output dynamic range is Y2, as shown in FIG. 9C. More specifically, unlike the first embodiment, the composite image generated by the composition processing of this embodiment includes, in an expression, a difference in gradation between a region 401 in the first target image and a region 411 in the second target image.

As described above, when performing additive composition of a plurality of images including one or more HDR images, the image processing apparatus of this embodiment can generate a composite image indicating a preferable brightness expression while ensuring the gradation expressions of the composition target images.

First Modification

The above-described second embodiment assumes that the dynamic range of the HDR image as a composition target is converted so that the maximum value of display luminance is constant. However, the disclosure is not limited to this. In the method of the second embodiment, the target images with different output dynamic ranges are compressed to the common output dynamic range, and thus the scene luminance and the signal level of each converted image may be reversed after conversion depending on a difference in peak luminance value between the HDR images as composition targets. That is, with respect to objects with same scene luminance, display luminance higher in the first converted image than in the second converted image may be indicated. An object in the second target image which should originally be brighter than an object in the first target image may become darker in the second converted image than in the first converted image. In this modification, the forms of converting the dynamic ranges of the target images in operation S702 are made different from each other so the gradation is not reversed between the converted images.

The dynamic range conversion processing according to this modification is performed by a method of converting scene luminance into display luminance with reference to the common conversion characteristic regardless of the target image, and changing the maximum value of the display luminance of each target image after conversion in accordance with the peak luminance value of the target image. More specifically, if the first target image and the second target image are as shown in FIGS. 4A and 4B, respectively, and the signal characteristics are as shown in FIGS. 5A and 5B, respectively, for example, the dynamic ranges of the target images are converted, as shown in FIGS. 10A and 10B, respectively.

Conversion of the dynamic ranges of the target images is the same as in the second embodiment in that the maximum signal level (display luminance) which can be obtained by a composite image obtained by performing additive composition of the images after conversion is the peak signal level. That is, conversion is performed so that the sum of a maximum value Y1' of the display luminance of the first converted image according to this modification shown in FIG. 10A and a maximum value Y2' of the display luminance of the second converted image according to this modification shown in FIG. 10B is Y2 as the peak signal level.

On the other hand, the signal characteristics of the converted images have a common portion within the level range up to the maximum value of the display luminance of each image, as shown in FIGS. 10A and 10B. More specifically, each signal characteristic is a knee characteristic in which the gradation is linearly kept with respect to the scene luminance up to the common knee point and compression is performed to set the output to Y1' or Y2' when the scene luminance (input) exceeding the knee point is Y1 or Y2. By using the common conversion characteristic with respect to the respective target images and changing the maximum value of the display luminance of each image in accordance with the peak luminance value, it is possible to convert the dynamic ranges while preventing the signal level from exceeding the peak signal level after additive composition and preventing the gradation from being reversed between the converted images.

As described above, when performing additive composition of a plurality of images including one or more HDR images, the image processing apparatus of this modification can generate a composite image indicating a preferable brightness expression while ensuring the absolute gradation expression of the scene luminance.

Second Modification

The above second embodiment and first modification have explained the case in which the dynamic range of the target image is converted based on the knee characteristic in which the conversion characteristic changes at the predetermined knee point, as shown in FIGS. 8A, 8B, 10A, and 10B. However, the disclosure is not limited to this. The dynamic range of the target image may be converted by adopting an arbitrary conversion method such as the gamma characteristic or scale conversion.

Third Modification

The above embodiments and modifications have explained the form in which one composition target image is associated with MaxDRL indicating the peak luminance value and MaxDRL is read out and decided as the peak signal level. However, the disclosure is not limited to this. For example, in the form in which a maximum signal PQ code value corresponding to the image capturing condition of an image such as an image capturing mode and an exposure amount is stored in advance in the recording device 104, the maximum signal PQ code value may be acquired based on information of the image capturing condition of the target image and decided as the peak signal level.

Fourth Modification

The above embodiments and modifications have explained the case in which two HDR images are composition target images. However, the disclosure is not limited to this, and is applicable to a form in which three or more HDR images are composited. In this case, as the peak signal level, the maximum value of the peak luminance values of the plurality of HDR images as composition targets is decided. Alternatively, one of the peak luminance values of the plurality of HDR images may be adopted as the peak signal level.

In this form, similar to the second embodiment, when the dynamic range is converted to equally divide the maximum value of the display luminance values of the target images, a value obtained by dividing the peak signal level by the number of composition target images is set as the maximum value of the display luminance value of each target image after conversion. Similar to the first modification, when the dynamic range is converted such that the maximum value of the display luminance of each target image is changed in accordance with the peak luminance value of the target image, adjustment is performed so that the sum of the maximum values of the display luminance values of the target images after conversion is the peak signal level.

Fifth Modification

The above embodiments and modifications have explained the case in which all composition target images are HDR images. However, the disclosure is not limited to this, and an SDR image may be included as another image as long as one or more HDR images are included as targets. In this case, since the SDR image is an image relatively expressing scene luminance, the SDR image is nonlinearized, scaled to arbitrary peak luminance, and linearized to an HDR image to perform the same processing so that the SDR image is preferably composited with the HDR image. At this time, for example, the arbitrary peak luminance used for scaling may be set to a fixed value such as 100 nit or set based on a user input.

In the above description, the HDR image as a composition target is an HDR image of the PQ method. However, the disclosure is also applicable to a form in which an HDR image of the HLG method which is not used up to the maximum signal value is used.

Sixth Modification

The above embodiments and modifications have explained the case in which the peak signal level set to the maximum value of the output dynamic range of the composite image is decided based on the peak luminance value of one of the HDR images as composition targets. However, the disclosure is not limited to this. As the peak signal level, an arbitrary value received based on a user input or the like accepted via the operation I/F 105 may be decided within, for example, a maximum display luminance range of 1,023.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041764, filed Mar. 16, 2022, which is hereby incorporated by reference herein in its entirety.

What is claimed is:

1. An image processing apparatus for generating a composite image, comprising
   at least one processor; and
   at least one memory containing instructions that, when executed by the at least one processor, cause the at least one processor to be configured to function as following units:
   an acquisition unit configured to acquire a plurality of images including at least one High Dynamic Range (HDR) image;
   a decision unit configured to decide a peak luminance value of the composite image; and
   a generation unit configured to generate the composite image by executing additive composition processing using the plurality of images,
   wherein the additive composition processing sums signal levels of corresponding pixels from the plurality of images without applying transparency weighting coefficients, and
   wherein the generation unit controls the additive composition processing so that a signal level of each pixel of the composite image falls within an output dynamic range whose maximum value is set to a signal level corresponding to the peak luminance value decided by the decision unit.

2. The apparatus according to claim 1, wherein
   the HDR image is an HDR image encoded by a Perceptual Quantization (PQ) method standardized in ITU-R BT.2100, and
   the decision unit decides a peak luminance value of the HDR image as the peak luminance value of the composite image.

3. The apparatus according to claim 2, wherein if a plurality of HDR images are included in the plurality of images, the decision unit decides a maximum value of peak luminance values of the plurality of HDR images as the peak luminance value of the composite image.

4. The apparatus according to claim 1, wherein
   the HDR image is an HDR image encoded by a Perceptual Quantization (PQ) method standardized in ITU-R BT.2100, and
   the decision unit decides a peak luminance value corresponding to an image capturing condition of the HDR image as the peak luminance value of the composite image.

5. The apparatus according to claim 1, wherein the at least one processor further function as an input unit configured to accept an input of the peak luminance value of the composite image, and
   the decision unit decides the peak luminance value of the composite image based on the input accepted by the input unit.

6. The apparatus according to claim 1, wherein the generation unit generates an intermediate image by performing additive composition of the plurality of images, and generates the composite image by changing, with respect to a pixel whose signal level exceeds the maximum value of the output dynamic range among pixels included in the intermediate image, the signal level to the maximum value.

7. The apparatus according to claim 1, wherein the generation unit generates the composite image by converting a dynamic range of each of the plurality of images so a signal level of each pixel after additive composition does not exceed the maximum value of the output dynamic range, and performing additive composition of the plurality of images after the conversion.

8. The apparatus according to claim 7, wherein the dynamic range is converted to set, as a maximum value of display luminance of each of the plurality of images after conversion, a value obtained by dividing the maximum value of the output dynamic range by the number of the plurality of images.

9. The apparatus according to claim 7, wherein the dynamic range is converted to change a maximum value of display luminance of each of the plurality of images after conversion in accordance with a peak luminance value of each image.

10. The apparatus according to claim 9, wherein the dynamic range is converted with reference to a common conversion characteristic with respect to the plurality of images.

11. The apparatus according to claim 1, wherein the at least one processor further function as an output unit configured to output an image file that associates the composite image generated by the generation unit with the maximum value of the output dynamic range.

12. A control method for an image processing apparatus that generates a composite image, comprising:

acquiring a plurality of images including at least one High Dynamic Range (HDR) image;

deciding a peak luminance value of the composite image; and generating the composite image by executing additive composition processing using the plurality of images, wherein the additive composition processing sums signal levels of corresponding pixels from the plurality of images without applying transparency weighting coefficients, and wherein in the generating, the additive composition processing is controlled so that a signal level of each pixel of the composite image falls within an output dynamic range whose maximum value is set to a signal level corresponding to the peak luminance value decided in the deciding.

13. A computer-readable recording medium recording a program for causing a computer to function as each unit of an image processing apparatus defined in claim 1.

* * * * *